(12) United States Patent
Wirth

(10) Patent No.: US 10,800,273 B2
(45) Date of Patent: Oct. 13, 2020

(54) INDUCTIVELY TRANSFERRING ELECTRIC ENERGY TO A VEHICLE USING CONSECUTIVE SEGMENTS WHICH ARE OPERATED AT THE SAME TIME

(71) Applicant: Bombardier Primove GmbH, Berlin (DE)

(72) Inventor: Christian Wirth, Winterthur (CH)

(73) Assignee: Bombardier Primove GmbH, Berlin (DE)

( * ) Notice: Subject to any disclaimer, the term of this patent is extended or adjusted under 35 U.S.C. 154(b) by 281 days.

(21) Appl. No.: 15/761,509

(22) PCT Filed: Sep. 20, 2016

(86) PCT No.: PCT/EP2016/072264
§ 371 (c)(1),
(2) Date: Mar. 20, 2018

(87) PCT Pub. No.: WO2017/050743
PCT Pub. Date: Mar. 30, 2017

(65) Prior Publication Data
US 2018/0264964 A1    Sep. 20, 2018

(30) Foreign Application Priority Data
Sep. 21, 2015  (GB) .................... 1516702.6

(51) Int. Cl.
*B60L 53/12*    (2019.01)
*B60L 5/42*     (2006.01)
(Continued)

(52) U.S. Cl.
CPC ............. *B60L 53/12* (2019.02); *B60L 5/19* (2013.01); *B60L 5/42* (2013.01); *B60L 11/1837* (2013.01);
(Continued)

(58) Field of Classification Search
CPC .... B60L 5/00; B60L 5/005; B60L 5/36; B60L 5/38; B60L 9/00; B60L 9/02; B60L 9/16; B60L 13/00; B60L 13/03; B60L 13/10
See application file for complete search history.

(56) References Cited

U.S. PATENT DOCUMENTS

2008/0106155 A1* 5/2008 Yamada .................. B60L 13/03
                                                                   310/12.19
2011/0253495 A1  10/2011 Vollenwyder et al.
(Continued)

FOREIGN PATENT DOCUMENTS

| WO | 2010031593 A2 | 3/2010 |
| WO | 2011145953 A1 | 11/2011 |
| WO | 2013068534 A2 | 5/2013 |

*Primary Examiner* — Robert J McCarry, Jr.
(74) *Attorney, Agent, or Firm* — The Webb Law Firm

(57) ABSTRACT

The invention relates to an arrangement (11, 21, 41) for transferring electric energy to a vehicle, in particular to a track bound vehicle such as a light rail vehicle (81) or to a road automobile, wherein—the arrangement (11, 21, 41) comprises an electric conductor arrangement (41) for producing an alternating electromagnetic field and for thereby transferring the energy, —the conductor arrangement (41) comprises a plurality of consecutive segments (T1, T2, T3, T4, T5), wherein the segments (T1, T2, T3, T4, T5) extend in the direction of travel of the vehicle, —each of the consecutive segments (T1, T2, T3, T4, T5) comprises at least one alternating current line (44a, 44b, 44c) for carrying a phase of an alternating current in order to produce the alternating electromagnetic field, —each of the consecutive segments (T1, T2, T3, T4, T5) is combined with an assigned controller (CTR1; 31) adapted to control the operation of the segment (T1, T2, T3, T4, T5) independently of the other segments (T1, T2, T3, T4, T5), —at least two neighbouring segments (41a, 41b) of the consecutive segments (T1, T2, T3, T4, T5) are inductively coupled to each other so that a first segment (41b) of the neighbouring segments (41a, 41b), while the first segment (41b) is operated under control of its assigned controller (CTR1; 31), induces a voltage and
(Continued)

thereby produces an induced alternating electric current in a second segment (41a) of the neighbouring segments (41a, 41b), if the second segment (41a) is not operated under control of its assigned controller (CTR1; 31), —the arrangement (11, 21, 41) comprises a controllable coupling (S1) for coupling the second segment (41a) to a load (RL; F1, S1; 105), which controllable coupling (S1) has a first operating state in which the second segment (41a) is coupled to the load (RL; F1, S1; 105) so that any alternating electric current in the second segment (41a) is damped by the load (RL; F1, S1; 105), and has a second operating state in which the second segment (41a) is not coupled to the load (RL; F1, S1; 105) so that any alternating electric current in the second segment (41a) is not damped by the load (F1, S1; 105), —the arrangement (11, 21, 41) is adapted to switch the controllable coupling (S1) to the first operating state before, while and/or after a time interval starts in which the second segment (41a) is not operated under control of its assigned controller (CTR1; 31) and in which the first segment (41b) is operated under control of its assigned controller (CTR1; 31) so that the induced alternating electric current in the second segment (41a), which is produced by operation of the first segment (41b), is damped by the load (F1, S1; 105).

20 Claims, 12 Drawing Sheets

(51) Int. Cl.
*B60L 5/19* (2006.01)
*B60L 53/30* (2019.01)
*B60L 53/22* (2019.01)
*B60L 53/38* (2019.01)
*B60L 11/18* (2006.01)

(52) U.S. Cl.
CPC ............... *B60L 53/22* (2019.02); *B60L 53/32* (2019.02); *B60L 53/38* (2019.02); *B60L 2200/18* (2013.01); *B60L 2200/26* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01)

(56) References Cited

U.S. PATENT DOCUMENTS

| | | |
|---|---|---|
| 2011/0266109 A1 | 11/2011 | Meins et al. |
| 2013/0229061 A1 | 9/2013 | Budhia et al. |
| 2014/0097674 A1 | 4/2014 | Vollenwyder |
| 2014/0318913 A1* | 10/2014 | Woronowicz ........... B60L 5/005 191/10 |

* cited by examiner

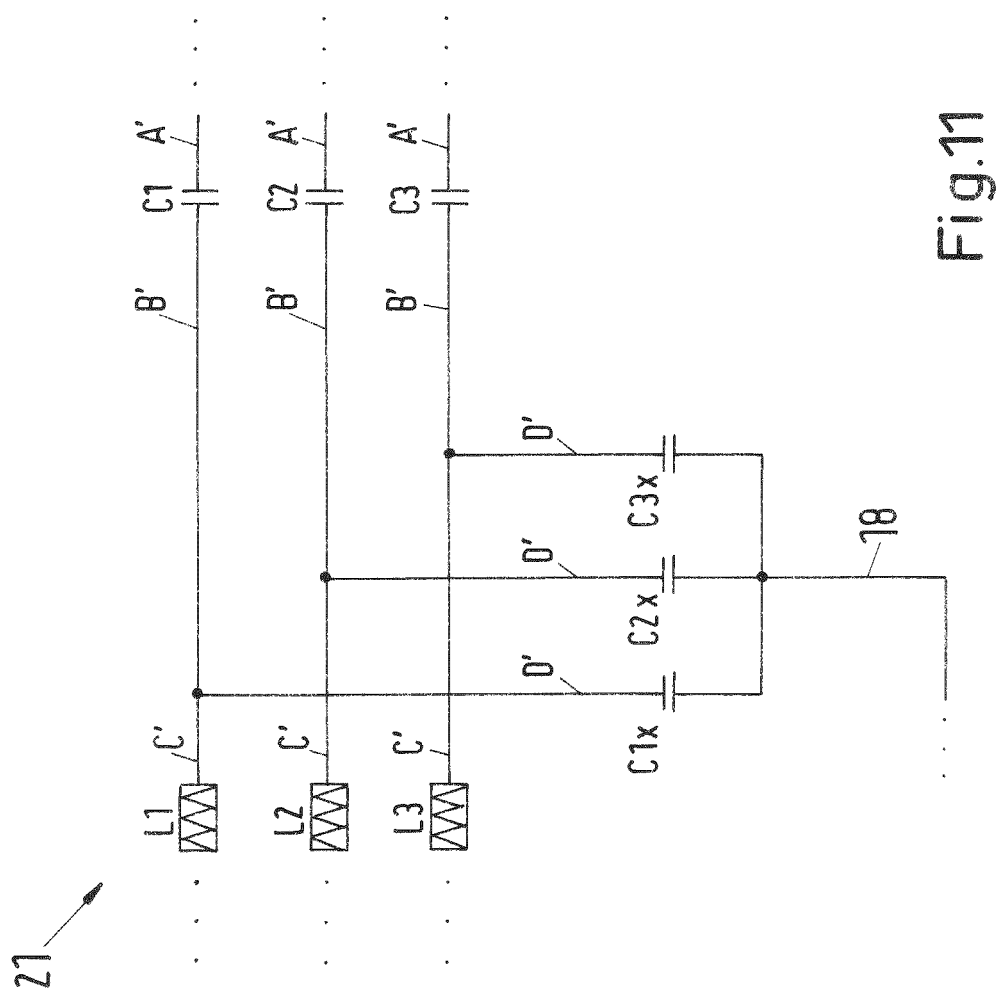

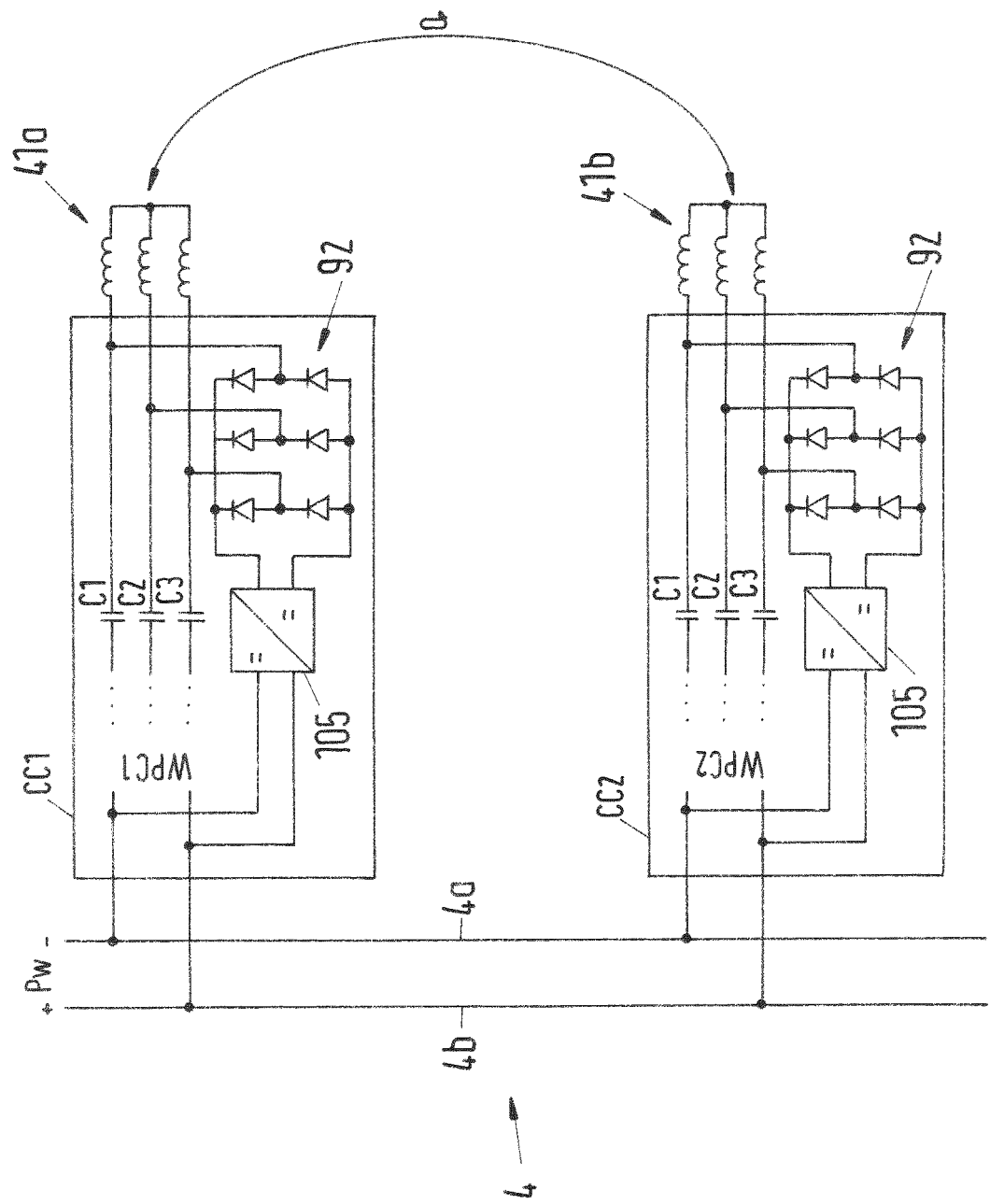

INDUCTIVELY TRANSFERRING ELECTRIC ENERGY TO A VEHICLE USING CONSECUTIVE SEGMENTS WHICH ARE OPERATED AT THE SAME TIME

CROSS-REFERENCE TO RELATED APPLICATIONS

This application is the United States national phase of International Application No. PCT/EP2016/072264 filed Sep. 20, 2016, and claims priority to United Kingdom Patent Application No. 1516702.6 filed Sep. 21, 2015, the disclosures of which are hereby incorporated in their entirety by reference.

BACKGROUND OF THE INVENTION

Field of the Invention

The invention relates to the wireless transfer of electric energy to a vehicle, in particular to a track bound vehicle such as a light rail vehicle (e.g. a tram) or to a road automobile such as a bus.

Description of Related Art

A corresponding arrangement for transferring electric energy to a vehicle comprises an electric conductor arrangement for producing an alternating electromagnetic field and for thereby transferring electromagnetic energy to the vehicle. The conductor arrangement comprises a plurality of consecutive segments, wherein the segments extend in the direction of travel of the vehicle, which is defined by the track or path of travel. The segments may form a row of segments so that the vehicle can be provided with energy from the segments over the whole path of travel or over a section of the path of travel. In each part of the path of travel or of the section at least one of the segments can be operated to provide the energy to the vehicle.

Each segment is combined with an assigned controller adapted to operate the segment independently of the other segments. Operation of a segment in this context means that the segment produces an electromagnetic field for transferring energy to a secondary side receiving device. This means that each segment can be operated while no other segment or no neighbouring segment is to be operated.

For example, the controller is the control device of an inverter, which inverts a direct current in a current supply (e.g. a direct current line providing electric energy to a plurality of the segments) into an alternating current through the segment. According to another example, the controller is the control device of an AC/AC converter which converts an alternating current in an alternating current supply to an alternating current in the respective segment having a different alternating current frequency. In case of inverters, the current supply may be adapted in the way described in WO 2010/031593 A1. Alternatively, the current supply line may be an alternating current supply line. It is also possible to combine two or more current supplies, namely at least one alternating current supply with at least one direct current supply, wherein each supply is connected to the respective segment via either an inverter or an AC/AC converter.

The arrangement of the present invention can have segments realized as described in WO 2010/031593 A1. Alternatively, the segments may be electrically parallel to each other. Each segment may only be connected indirectly to the other segments via the assigned converter (e.g. either an inverter or an AC/AC-converter), the supply line and the respective assigned converter of the other segment. However, according to a specific embodiment, the same converter may be assigned to a plurality of segments. In this case, the individual segments which are connected to the common assigned converter are not neighbouring segments and, preferably, are not operated at the same time. For example, a corresponding switch or set of switches is provided in an alternating current connection between the segment side of the converter and at least one of the segments. By controlling the switch or switches, the segment or segments is/are selected which can be operated by the converter (by feeding an alternating current to the segment) at a time.

The controllers of at least two consecutive segments, which follow each other in the direction of travel of the vehicle, or follow each other opposite to the direction of travel, may be connected to each other and/or to a central controlling device so that the operation of the at least two consecutive segments can be coordinated. Each segment may comprise at least three alternating current lines for carrying phases of a multi-phase alternating current in order to produce the alternating electromagnetic field. In this case, each line carries a different phase during operation. For example, the alternating current lines of each segment may comprise a plurality of sections which extend transversely to the direction of travel of the vehicle. The transversely extending sections of the at least three alternating-current lines of each segment may form, if viewed in the direction of travel, a repeating sequence of phases of the alternating current, while the segment is operated under control of the assigned controller, wherein each complete repetition of the sequence of phases comprises one transversely extending section of each phase and the order of the phases is the same in each complete repetition. For example in the case of a three-phase alternating current having phases U, V, W, the order of the sequence of the transversely extending sections may be U-V-W-U-V-W (and so on) and one complete repetition of the sequence of phases is U-V-W.

The embodiment with transversely extending sections is an example of an arrangement which can produce a continuous electromagnetic field in the transition zone of neighbouring consecutive segments if the segments are operated at the same time. Preferably, the distance between any two transversely extending sections of each phase line, which follow each other in the direction of travel, is constant, even across transition zones of neighbouring segments. Therefore, the electromagnetic field produced is particularly homogeneous with respect to the direction of travel.

An arrangement as described before is disclosed by WO 2013/068534 A2. The invention also relates to a corresponding method of operating the arrangement and to a corresponding method of manufacturing the arrangement.

Track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to an arrangement for transferring electric energy to a vehicle which is not necessarily (but preferably) a track bound vehicle. A vehicle other than a track bound vehicle is a bus, for example. An application area of the invention is the transfer of energy to vehicles for public transport. However, it is also possible to transfer energy to private automobiles or to unmanned vehicles using the arrangement of the present invention. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

In order to reduce or avoid electromagnetic fields where no vehicle is driving at a time, segments of the conductor arrangement may be operated where required only. For example, the lengths of the segments along the path of travel are shorter than the length of a vehicle in the travel direction and the segments may be operated only if a vehicle is already occupying the respective region of the path of travel along which the segment extends. In particular, occupied by a rail vehicle means that the vehicle is driving on the rails along which the segment extends. For continuous energy transfer while the vehicle is driving, it is proposed that the segment is switched on (i.e. the assigned controller starts the production of the alternating current through the segment) before a receiving device of a vehicle for receiving the transferred energy enters the region of the path of travel along which the segment extends. However, this means that two or more than two consecutive segments may be operated at the same time. Otherwise, the energy transfer to the vehicle may be interrupted and transients of the voltage induced in the vehicle's receiver may be generated. It is also of advantage that the two consecutive segments overlap each other partially so that there is no gap in between the segments without transfer of energy to the vehicle.

WO 2010/031593 A1 describes a system and a method for transferring electric energy to a vehicle, wherein the system comprises features mentioned before. However, the segments are electrically connected in series to each other and there is one inverter at each interface between two consecutive segments. It is disclosed that switches of the inverters are controlled to produce the alternating current. Each switch may be controlled by a drive unit which controls the timing of individual processes of switching on and switching off the switch. The drive units may be controlled by a controller of the inverter which coordinates the timing of all drive units.

Two neighbouring consecutive segments may be operated at the same time, for example if a vehicle occupies parts of both segments. However, it also happens that only one of two consecutive, neighbouring segments is operated while the other of the two neighbouring segments is not operated, for example because a vehicle only occupies one of the segments. If there is no significant distance between the neighbouring segments they are inductively coupled to each other. In particular, this is the case if the neighbouring segments partially overlap as for example shown in FIG. 6 of WO 2013/068534 A2, wherein the segments overlap not only with overlapping electric lines placed upon each other, or as shown in FIG. 9 of WO 2011/145953 A1, wherein just electric lines of the neighbouring segments overlap. Overlapping neighbouring segments allow for the generation of a continuous electromagnetic field, as for example described in WO 2013/068534 A2. On the other hand, the operation of a first of the neighbouring segments, while the second of the neighbouring segments is not operated under control of its assigned controller, results in an electric voltage being induced in the second segments caused by the alternating electric current in the first segment and the resulting electromagnetic field. Due to the electric voltage induced in the second segment, an induced alternating electric current flows in the second segment and produces an electromagnetic field over the entire length of the segment. For the reason of electromagnetic compatibility and of protecting living beings, threshold values of the electromagnetic field intensity have to be observed. If no vehicle occupies the second segment, the second segment is not covered by a vehicle and the field intensity of the electromagnetic field generated by the alternating electric current in the second segment may be beyond the threshold values.

One possibility to avoid field intensities above the threshold values is to provide a sufficient gap between the neighbouring, consecutive segments. However, it is preferred to provide a continuous electromagnetic field while a vehicle is travelling along the consecutive segments.

Another possibility to avoid field intensities above the threshold values is to provide segments having short lengths in the direction of travel. If a vehicle occupies several segments, two or three of the segments can be operated at the same time while being occupied by the vehicle and this allows for switching on and off segments while they are fully occupied by the vehicle. However, the effort of manufacturing and operating such an arrangement of segments is very high. In particular, each segment requires an assigned controller for controlling the operation of the segment and requires an assigned converter for producing the alternating electric current through the segment during operation. It may be possible to use converters commonly for different segments which cannot be operated at the same time, because they are not neighbouring segments, but the effort is still high.

Furthermore, it would be possible to disconnect the second segment from the converter which produces the alternating electric current through the segments during operating under control of the assigned controller. While the second segment is not operated, at least one switch in the segment, in between the segment and the converter or within the converter could be opened so that the electric voltage induced in the second segment cannot produce an induced alternating electric current. Typical converters do not comprise such switches for preventing a current flow while the converter is not operated. Rather, there are typically freewheeling diodes connected in parallel of the switches of the converter. It would be necessary to add switches in order to prevent current flows through the freewheeling diodes. However, switches cause losses and additional effort for manufacturing the arrangement would be required.

SUMMARY OF THE INVENTION

It is therefore an object of the present invention to provide an arrangement for transferring electric energy to a vehicle of the kind described above, in particular in the first paragraph of the description, which allows for observing threshold values for electromagnetic field intensities at low effort for manufacturing and operating the arrangement. It is a further object of the present invention to provide a corresponding method of operating and/or manufacturing the arrangement. In particular, it shall be possible to operate neighbouring consecutive segments at the same time and to produce thereby an electromagnetic field being continuous in the transition region of the two neighbouring consecutive segments.

According to a basic idea of the present invention, an additional load is provided to the second segment. This load is used to damp the induced alternating electric current while the second segment is not to be operated under control of its assigned controller. The additional load is, on the other hand, not coupled to the second segment while the segment is operated under control of its assigned controller in order to produce an electromagnetic field for transferring energy to a vehicle occupying the segment.

For simplicity, the term "second segment" is used throughout the description for a segment of the plurality of consecutive segments which is not operated or not to be operated under control of its assigned controller at a time. The term "first segment" is used for a segment which is a neighbouring and possibly overlapping segment to the second segment, which first segment may be operated under control of its assigned controller in order to produce an electromagnetic field for energy transferred to a vehicle while the second segment is not operated. During operation of the arrangement comprising the consecutive segments it may happen that the operation of the first segment stops. Furthermore, it may happen that the operation of the second segment under control of its assigned controller starts in order to transfer energy to a vehicle. Therefore, the first segment may become the second segment and vice versa.

Therefore, it is preferred that not only one of the consecutive segments can be coupled to an additional load for damping an induced alternating electric current. Rather, it is preferred that an additional load can be coupled to at least two neighbouring consecutive segments and preferably to all of the consecutive segments. In a row of consecutive segments, all segments have two neighbouring segments except the segments at the end of the row. If any one of these segments is not operated and one of its neighbouring segments is operated to transfer energy to a vehicle, the segment which is not operated is preferably coupled to a load in order to damp an induced alternating electric current.

In addition to the load, it is proposed to provide a controllable coupling for coupling the second segment to the load. The controllable coupling enables the arrangement to couple and decouple the load to/from the second segment. Therefore, the additional load can damp the induced alternating electric current while the segment is not operated and the load can be decoupled from the second segment so that it does not damp a desired alternating current produced in the segment during operation in order to transfer energy to a vehicle.

The timing of switching between the coupled state of the load and the decoupled state of the load may be realized in different manner. Generally speaking it is preferred that the load is always coupled to the second segment while the second segment is not operated and a neighbouring first segment is operated. According to a simple and reliable embodiment, the load is coupled to the second segment, for example by switching on a corresponding switch that couples the load to the segment, every time when the operation of the segment is stopped or within a predetermined time interval after the operation of the segment has stopped. For example, the operation of the second segment can be stopped first by its assigned controller and then the assigned controller or another controller can control the coupling of the load to the segment.

If the operation of the segment is to be started, the load can be decoupled from the segment at the same time as the operation starts or within a time interval of defined length before the operation is started. For example, the controller assigned to the segment or another controller can decouple the load from the segment (for example by switching off a corresponding switch) first and then the assigned controller can start operating the segment. However, it is alternatively possibly to detect an induced alternating electric current through the second segment while the segment is not operated and to couple the load to the segment as a reaction to the detected current.

Generally speaking, the controllable coupling has a first operating state in which the second segment is coupled to the load and has a second operating state in which the second segment is not coupled to the load and the controllable coupling is controllable to switch between the first and second operating states.

The controllable coupling may be realized in different manners. Embodiments will be described below. In particular, the controllable coupling can be a coupling realized by at least one electric connection between the second segment and the load. Another example is an electromagnetic or inductive coupling, or more generally speaking a wireless connection.

In particular, the following is proposed: An arrangement for transferring electric energy to a vehicle, in particular to a track bound vehicle such as a light rail vehicle or to a road automobile such as a bus, wherein the arrangement comprises an electric conductor arrangement for producing an alternating electromagnetic field and for thereby transferring the energy to the vehicle, the conductor arrangement comprises a plurality of consecutive segments, wherein the segments extend in the direction of travel of the vehicle, which is defined by the track or path of travel, each of the consecutive segments comprises at least one alternating current line for carrying a phase of an alternating current in order to produce the alternating electromagnetic field, each of the consecutive segments is combined with an assigned controller adapted to operate the segment independently of the other segments, at least two neighbouring segments of the consecutive segments are inductively coupled to each other so that a first segment of the neighbouring segments, while the first segment is operated under control of its assigned controller, induces a voltage and thereby produces an induced alternating electric current in a second segment of the neighbouring segments, if the second segment is not operated under control of its assigned controller, the arrangement comprises a controllable coupling for coupling the second segment to a load, the controllable coupling has a first operating state in which the second segment is coupled to the load so that any alternating electric current in the second segment is damped by the load, and has a second operating state in which the second segment is not coupled to the load so that any alternating electric current in the second segment is not damped by the load, the arrangement is adapted to switch the controllable coupling to the first operating state before, while and/or after a time interval starts in which the second segment is not operated under control of its assigned controller and in which the first segment is operated under control of its assigned controller so that the induced alternating electric current in the second segment, which is produced by operation of the first segment, is damped by the load.

Embodiments of the manufacturing method and of the operating method follow from the description of the arrangement and the appended claims.

Since the load is damping the induced alternating current in the second segment, the alternating electromagnetic field caused by the induced alternating electric current is also damped. Therefore, its field intensity is reduced. Consequently, threshold values for the field intensity can easily be met. There is no need to operate short segments only so that the second segment would be fully covered by a vehicle if the first segment is operated. Furthermore, the inductive coupling between the first segment and the second segment may be significant as, for example, in the case that the first and second segments overlap each other partially. In addition, it is not necessary to block the induced alternating electric current in the second segment by providing and operating at least one additional switch. Therefore, electric losses caused by such a switch are avoided.

The invention is particularly useful for an arrangement, wherein the segments carry an alternating current while being operated under control of their assigned controller so that the alternating current through the respective segment is equal to a resonance frequency determined by the inductances and capacitances involved. Operating segments at their resonance frequency has the advantage that energy can be transferred to a vehicle with high efficiency. On the other hand, if the resonance frequencies of the neighbouring segments are equal to each other, as preferred, since the resonance frequencies also matches the resonance frequency of a receiver on board the vehicle, the alternating current through the first segment during operation results in a resonant induced alternating electric current in the second segment. Using the load and the controllable coupling, the amplitude of the induced alternating electric current in the second segment is significantly reduced by the damping and, as preferred, the load and the controllable coupling at least slightly alter the resonance frequency while the controllable coupling is in the first operating state in which the second segment is coupled to the load. Therefore, the resonance frequencies of the neighbouring first and second segments slightly differ while the controllable coupling is in the first operating stage. This also reduces the induced alternating electric current.

As mentioned before, the load damps the induced alternating electric current in the second segment. This means that energy which is coupled from the first segment into the second segment due to the mutual inductive coupling is dissipated by the load. As will be described in more detail, there are different possibilities how the load removes the energy from the second segment and dissipates the energy. One possibility is that the energy is dissipated into heat, which is the case if the load is an Ohmic resistance. Another possibility is to transfer the energy using the load to an energy storage and/or an electric circuit and/or an electric device so that at least a part of the transferred energy can be used for operating the arrangement and/or any additional device.

For example, the consecutive segments can be electrically connected in parallel to each other to a common current supply for supplying energy to the segments for their operation. A common current supply may also be used if the segments are connected in series to each other, for example as described in WO 2010/031593 A1.

In particular, the first segment and the second segment partially overlap each other. Overlapping in particular applies to the situation that the vehicle travels on the track or road and the segments extend along the track. Therefore, the overlap exists if the segments are viewed from a surface of the track or path of travel on which the vehicle may travel, in particular from above the segments in the direction below the surface. The benefit of the damping of the induced alternating electric current is particularly high, since the inductive coupling between the first and second segment is particularly high due to the overlap.

According to an embodiment, the controllable coupling comprises at least one controllable switch and the arrangement comprises a controller adapted to control the at least one controllable switch. The switch controller may be the controller assigned to the second segment for controlling the operation of the assigned converter, or may be a separate controller. Using the at least one controllable switch to switch the controllable coupling between its first and its second operating state is particularly easy to realize, reliable and can be performed within very short time intervals. However, there are different ways of using a combination of such at least one controllable switch and the load. In particular, the at least one controllable switch may be arranged in an electric line connecting the second segment to the load. Another possibility is that the at least one controllable switch is part of a converter for transferring the electric energy from the second segment to the current supply and/or to another device. Optionally, the at least one switch may comprise at least a part of an Ohmic resistance of the load.

According to a simple and reliable embodiment of the arrangement, the load comprises a resistance which damps the induced alternating electric current in the second segment, which is produced by operation of the first segment. As mentioned before, such an (Ohmic) resistance dissipates energy into heat.

According to a preferred embodiment, the load comprises a fuse through which the induced alternating electric current in the second segment flows, wherein the fuse is combined with a monitoring unit for monitoring an operating state of the fuse and for indicating an open state of the fuse, in which an electric current through the fuse is blocked, and wherein the arrangement comprises a control connected to the monitoring unit, the control being adapted to prevent operation of the first segment if the fuse of the load, which is coupled to the second segment, is in the open state. If the second segment has two or more than two (e.g. in case of different rows of consecutive segments) neighbouring segments, it is preferred that the operation of the two or more than two neighbouring segments is prevented if the fuse is in the open state.

In particular, the fuse may be connected in series to the switch or at least one of the switches of the controllable coupling mentioned above. The fuse may constitute a part of the resistance of the load and the switch may constitute another part of the resistance. The fuse has the advantage that can interrupt an electric connection required for the operation in the first operating state of the controllable coupling so that an electric current of a size above the opening threshold of the fuse brings the controllable coupling into the second operating state. Therefore, the arrangement is protected from over-currents, which may occur in case of a malfunction of the segment's assigned converter and/or in case of a short circuit, for example.

The combination of the monitoring unit and the fuse has the advantage that it is detected that the fuse has opened and the controllable coupling is therefore in the second operating state. Consequently, an induced alternating electric current in the second segment could not be damped anymore and the operation of the first segment under control of its assigned controller is prevented. For example, the monitoring unit may comprise a voltage measurement device for measuring the electric voltage across the fuse and/or the monitoring unit may have a signal output for outputting a signal indicating the open state of the fuse, wherein the signal output is connected to the control of the converter assigned to the first segment. In particular, the fuse protects the controllable switch of the controllable coupling, which may be provided in addition to the fuse.

According to an energy effective embodiment, the load comprises a current converter, which couples the second segment to a supply line for supplying energy to the first segment during operation of the first segment. According to an exemplary embodiment, the supply line may be adapted to supply energy to any of the segments which is to be operated, at least to the first segment and to the second segment or at least to the second segment and all of its neighbouring segments. By using the current converter, at least some of the energy which is coupled from the first segment into the second segment is transferred from the second segment to the current supply (the supply line) and can be used, in particular, for operating the first segment or any other segment which is operated at the time. The current converter may be an AC/DC (alternating current to direct current) converter if the supply line is a direct current supply line. However, it is preferred that the current converter comprises a DC/DC converter so that any DC voltage on the side of the second segment can be transferred to the voltage of the DC supply line. In particular, the current converter can therefore comprise a step-up converter for the typical case that the direct voltage on the side of the second segment is smaller than the direct voltage on the side of the supply line. However, the embodiment with the current converter is not restricted to direct current supply lines. In case of an alternating current supply line, a corresponding converter can be used. This converter may comprise a combination of individual converters, such as a DC/DC converter in combination with a DC/AC converter, wherein AC side of the DC/AC is connected to the AC supply line. A combination of converters can also be used if the supply line is a DC supply line. For example, an AC/DC converter, the AC side of which is connected to the second segment, may be combined with a DC/DC converter connected to the supply line. Furthermore, as will be described in more detail below, a (passively or actively controlled) rectifier can be used in any case of a load, not only in case of a current converter, but also in case of a load comprising a resistance.

The load can be coupled to the second segment in the first operating state of the controllable coupling via a rectifier adapted to rectify the induced alternating electric current in the second segment to a direct current flowing through the load. In particular, a resistance and/or a current converter as mentioned above can be connected to the DC side of the rectifier. In particular in the case that the segments comprise more than one phase line for carrying phases of a multi-phase alternating current (such as a three-phase alternating current) the rectifier simplifies the coupling of the second segment to the load. In particular, it is simple to connect a resistance and/or a current converter (such as a DC/DC converter) to the DC side of rectifier. However, in case of single-phase segments, when the alternating currents through the segments have a single phase only, a rectifier is not preferred for coupling the second segment to the load. In this case, the load can be connected directly to the second segment, without a rectifier.

As mentioned before, the features described above for the second segment can be realized not only for a single segment of the plurality of consecutive segments, but for several of the plurality of consecutive segments, in particular for all of the consecutive segments or for all of the consecutive segments having a neighbouring segment which is inductively coupling to the neighbouring segment.

BRIEF DESCRIPTION OF THE DRAWINGS

Examples of the present invention will be described with reference to the attached drawing. The figures of the drawing show.

DESCRIPTION OF THE INVENTION

In the examples which are described with reference to the figures the converters, that are assigned to the segments, are inverters, but corresponding examples may comprise AC/AC-converters and the direct current supply may be an alternating current supply instead. Furthermore, the examples refer to a rail vehicle. Alternatively, the arrangement can be used to provide energy to a road automobile, such as a passenger bus.

Figure 1:
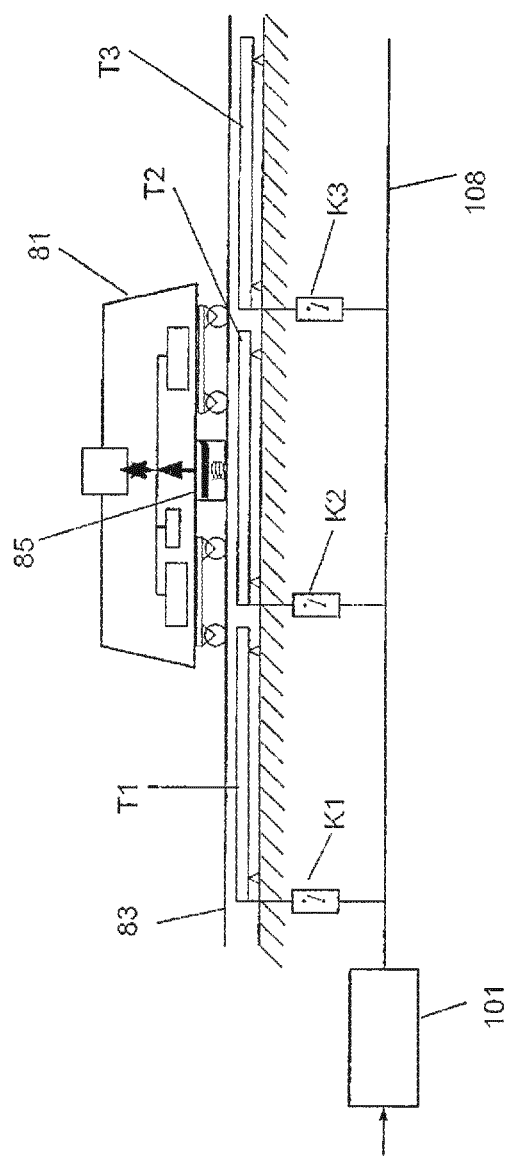
FIG. 1 schematically a rail vehicle which is travelling on a track that is equipped with an electric conductor arrangement comprising a plurality of consecutive segments which are connected in parallel to each other to a direct current supply, FIG. 2 an example of a three-phase conductor arrangement of a single segment, FIG. 3 for three different points in time, a situation in which a rail vehicle travels on a track, wherein the track is provided with a plurality of consecutive segments of a conductor arrangement, wherein the segments can be switched on and off for providing the vehicle with energy, FIG. 4 a preferred embodiment of a three-phase conductor arrangement at the transition zone of two neighbouring segments of the conductor arrangement, wherein electric lines of the two neighbouring segments are arranged to extend from the transition zone to a location sideways of the track, FIG. 5 an arrangement similar to the arrangement shown in FIG. 6, wherein two star-point connections of the three phases of the neighbouring segments are located in the transition zone, FIG. 6 an arrangement similar to the arrangement shown in FIG. 1, wherein the alternating current lines of in each case two neighbouring segments extend from a common transition zone to respective inverters in the manner shown in FIG. 4, FIG. 7 an exemplary circuit diagram of a segment having three phases which is connected to an assigned DC/AC converter, FIG. 8 schematically a circuit diagram showing the inductive coupling of two neighbouring segments, FIG. 9 a unit comprising a rectifier and a load resistance connected to electric connections between a segment and compensating capacitances, FIG. 10 an alternative unit for coupling a segment to a resistive load, the unit comprising a rectifier, a fuse, a switch and a monitoring unit for monitoring an operating state of the fuse, FIG. 11 a filter arrangement constituting a current source for connecting the segment to its assigned converter, wherein alternative connection points for connecting the load are shown, FIG. 12 a circuit diagram of two neighbouring consecutive segments connected to a common supply line via in each case one assigned DC/AC converter, wherein each segment is connected to a load via a rectifier and wherein the load is constituted by a converter for transferring energy from the segment via the rectifier to the supply line.

FIG. 1 shows a rail vehicle 81 travelling on a track 83 which is provided with a conductor arrangement for producing an electromagnetic field which induces an electric voltage in a receiver 85 of the vehicle 81.

The conductor arrangement is constituted by a plurality of consecutive segments T1, T2, T3. Further segments may be provided, but are not shown in FIG. 1. Each segment T1, T2, T3 is connected to a direct current supply 108 via in each case one assigned inverter K1, K2, K3. The direct current in the supply 108 is provided by a power source 101.

Figure 2:
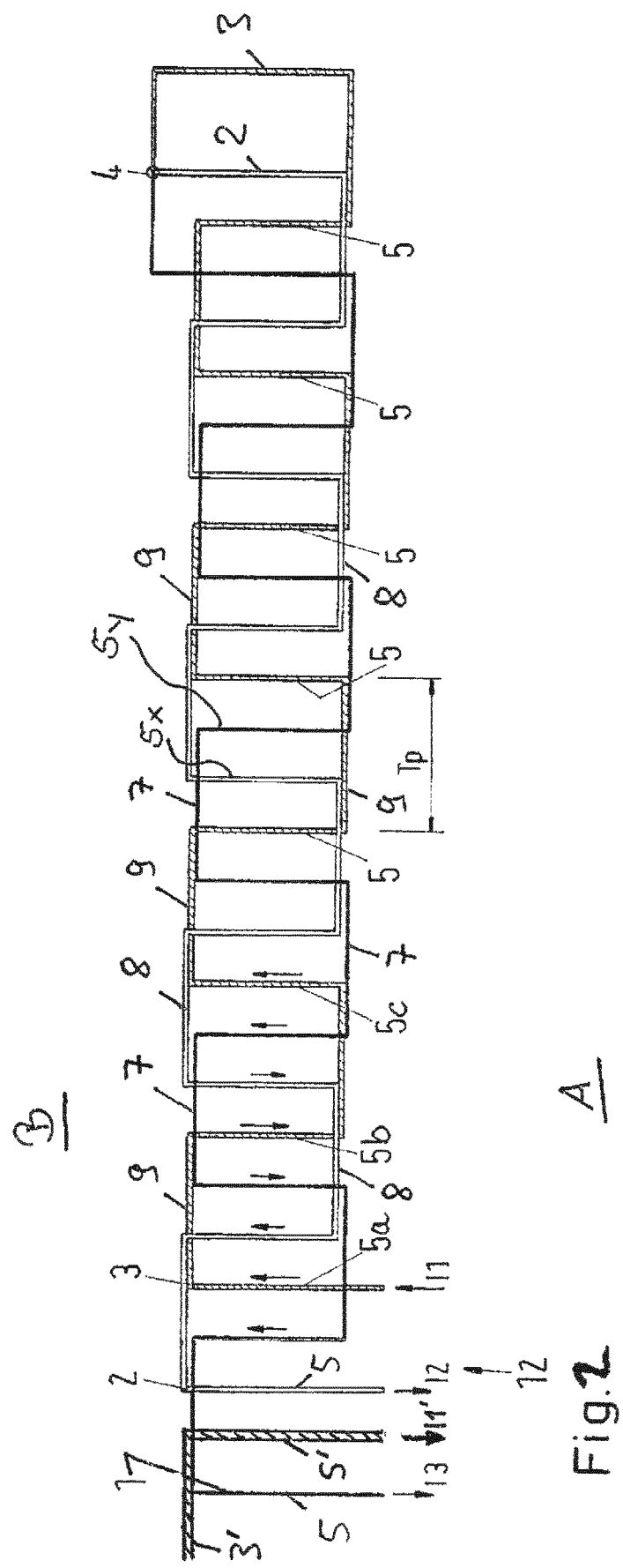

FIG. 2 shows the part of a conductor arrangement which may constitute one segment. The figure is understood to show a schematic view, but the distances between the transversely extending sections of the conduct arrangement may be to scale. The three lines 1, 2, 3 of the conductor arrangement comprise these sections which extend transversely to the direction of travel (from left to right or right to left). Only some of the transversely extending sections of lines 1, 2, 3 are denoted by a reference numerals, namely three sections 5*a*, 5*b* and 5*c* of line 3, some further sections of the line 3 by "5", one section 5*x* of line 2 and one section 5*y* of line 1. For example, the arrangement 12 shown in FIG. 2 is located underground of the track so that FIG. 2 shows a top view onto the arrangement 12. The track may extend from left to right, at the top and the bottom in FIG. 2, i.e. the transversely extending line sections may be completely within the boundaries defined by the limits of the track.

Figure 5:
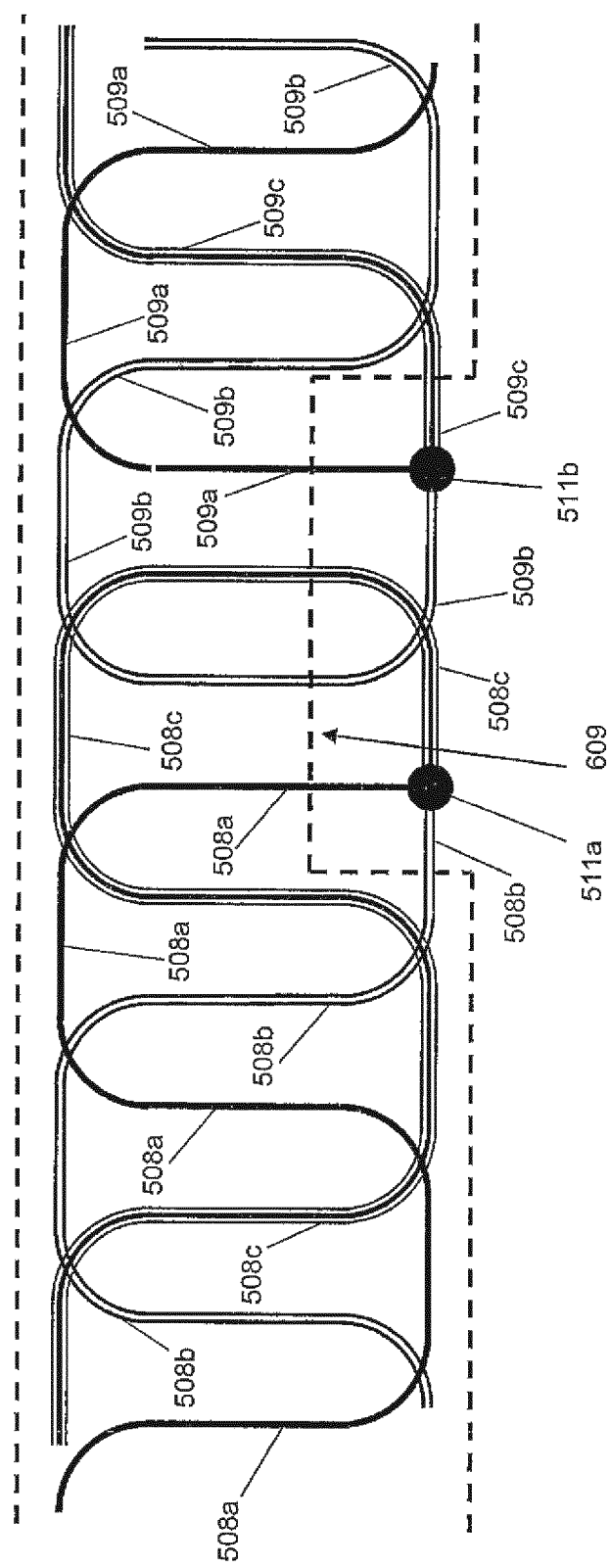

For example in the manner as shown in FIG. 5, the three lines 1, 2, 3 may be connected to an inverter K. At the time which is depicted in FIG. 2, a positive current 11 is flowing through line 3. "Positive" means, that the current flows from the inverter into the line. The three lines 1, 2, 3 are connected to each other at the other end of the arrangement at a common star point 4. Consequently, at least one of the other currents, here the current 12 through the line 2 and the current 13 through the line 1, are negative. Generally speaking, the star point rule applies which means that the sum of all currents flowing to and from the star point is zero at each point in time. The directions of the currents through lines 1, 2, 3 are indicated by arrows.

The sections of line 3 and the corresponding sections of lines 1, 2 which extend transversely to the direction of travel preferably have the same width and are parallel to each other. In practice, it is preferred that there is no shift in width direction between the transversely extending sections of the three lines. Such a shift is shown in FIG. 2 for the reason that each section or each line can be identified.

Preferably, each line follows a serpentine-like path (also called: meandering path) along the track in the same manner, wherein the lines are shifted in the direction of travel by one third of the distance between neighbouring consecutive sections of the same line extending transversely to the direction of travel. For example, as shown in the middle of FIG. 2, the distance between neighbouring consecutive sections 5 of line 3 is denoted by $T_P$. Within the region between these neighbouring consecutive sections 5, there are two other sections which extend transversely to the direction of travel namely, section 5*x* of line 2 and section 5*y* of line 1. This pattern of consecutive sections 5, 5*x*, 5*y* repeats at regular distances between these sections in the direction of travel.

The corresponding direction of the current which flows through the sections is shown in the left region of FIG. 2. For example, section 5*a* carries a current from a first side A of the arrangement 12 to the opposite side B of the arrangement. Side A is one side of the conductor arrangement or track (such as the right hand side in the direction of travel, when viewed from a travelling vehicle) and side B is the opposite side (e.g. the left side of the track), if the arrangement 12 is buried in the ground under the track, or more generally speaking, extends in a horizontal plane.

The section 5*b* consequently carries an electric current at the same time which is flowing from side B to side A. The next consecutive (i.e. the neighbouring) section 5*c* of line 3 is consequently carrying a current from side A to side B. All these currents have the same size, since they are carried by the same line at the same time. In other words: the sections which extend transversely are connected to each other by connecting sections which extend in the direction of travel.

As a result of this serpentine like line arrangement, the magnetic fields which are produced by sections 5*a*, 5*b*, 5*c*, . . . of the line 3 produce a row of successive magnetic poles of an electromagnetic field, wherein the successive magnetic poles (the poles produced by section 5*a*, 5*b*, 5*c*, . . . ) have alternating magnetic polarities. For example, the polarity of the magnetic pole which is produced by section 5*a* may correspond at a specific point in time a magnetic dipole, for which the magnetic north pole is facing upwardly and the magnetic south pole is facing downwardly. At the same time, the magnetic polarity of the magnetic field which is produced by section 5*b* is oriented at the same time in such a manner that the corresponding magnetic dipole is facing with its south pole upwardly and with its north pole downwardly. The corresponding magnetic dipole of section 5*c* is oriented in the same manner as for section 5*a* and so on. The same applies to lines 1 and 2.

However, the present invention is not limited to the case that there are three phases and, correspondingly, three alternating current lines. Therefore, a conductor arrangement having only one phase may be arranged as line 3 in FIG. 2, but instead of the star point 4, the end of the line 3 (which is located at the right hand side of FIG. 2) may also be connected to the inverter (not shown in FIG. 2) by a connector line (not shown in FIG. 2) which extends along the track. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

In the case of the example shown in FIG. 2, but also in other cases, it is an object to avoid transients of the electromagnetic field which is produced at the interface of neighbouring consecutive segments. Such transients may occur for different reasons. One possible reason is the arrangement of the alternating current lines at the opposite ends of the segment. The distance $T_P$ between neighbouring consecutive transversely extending sections 5 of the same line was mentioned above. Since there are three alternating current lines 1, 2, 3 in the example of FIG. 2, the distance between neighbouring transversely extending sections of any of the lines 1, 2, 3 is one third of the distance $T_P$. However, this does not apply to parts of the transition zones at the opposite ends. On the left hand side in FIG. 2, where the lines 1, 2, 3 are connected to an external device, such as an inverter, the distance between the first transversely extending sections of lines 1, 2 is two thirds of the distance $T_P$. At the end of the segment on the right hand side of FIG. 2, the distance between the last transversely extending sections of lines 2, 3 is also two thirds of the distance $T_P$. The reason for this increased distance is that it shall be possible to maintain the repeating sequence of phases of the alternating current, even in the transition zones of two neighbouring segments.

In particular, a neighbouring consecutive segment may be arranged on the left hand side of FIG. 2. In this case, an alternating current line 3' of this neighbouring segment comprises a transversely extending section 5' which is placed in the middle between the first transversely extending sections of lines 1, 2. If this line 3' is operated in phase with line 3, the repeating sequence of phases is maintained in the transition zone. "In phase" means that the current carried by the transversely extending section 5' has the same amount at the same point in time, but the direction of the current through the transversely extending section 5' is opposite to the direction of the current through the transversely extending section 5a.

Similarly, there may be a further neighbouring consecutive segment in the area on the right hand side of FIG. 2, wherein a transversely extending section (not shown in FIG. 2) of a line may be placed in the middle between the last transversely extending sections of lines 2, 3.

As mentioned above, the view shown in FIG. 2 is a schematic view. This applies to the connecting sections of lines 1, 2, 3 which connect the transversely extending sections 5 of the lines 1, 2, 3. The connecting sections are shifted in lateral direction (the vertical direction in FIG. 2), so that the meandering path of the individual lines 1, 2, 3 can be followed. In practice, it is preferred to place the connecting sections "in line" with each other in the opposite side margins of the conductor arrangement. In FIG. 2, these side margins extend from left to right at the opposite sides A, B of the arrangement.

In the schematic view of FIG. 2, some of the connecting sections of line 1 are denoted by 7, some of the connecting sections of line 2 are denoted by 8 and some of the connecting sections of line 3 are denoted by 9. Since these connecting sections 7, 8, 9 are represented by straight lines, they could be shifted in two narrow side margins having the width of a line.

The arrangement of the transversely extending sections in the transition zones of two neighbouring segments, as described above, allows for a homogeneous electromagnetic field over the whole extension of the two neighbouring segments, including the transition zone. In addition, the arrangement shown in the transition zone on the left hand side of FIG. 2, wherein a transversely extending section of the neighbouring segment is arranged in between transversely extending sections of lines 1, 2 of the segment, saves space in the side margins, where the connecting sections are placed. The meandering paths of the lines 1, 2, 3 can be mapped on each other by shifting the paths by two third of the distance $T_P$. Therefore, parallel extending connecting sections can be avoided as far as possible. If the lines would be arranged so that they can be mapped on each other by just one third of the distance $T_P$, connecting lines of the three different alternating current lines 1, 2, 3 would extend in parallel to each other in some regions of the arrangement. It should be noted that the term "mapped on each other" does not refer to the end regions of the lines, i.e. the transition zones to the neighbouring segments.

More details of the arrangement shown in FIGS. 1 and 2 are disclosed in WO 2013/068534 A2.

Figure 3:
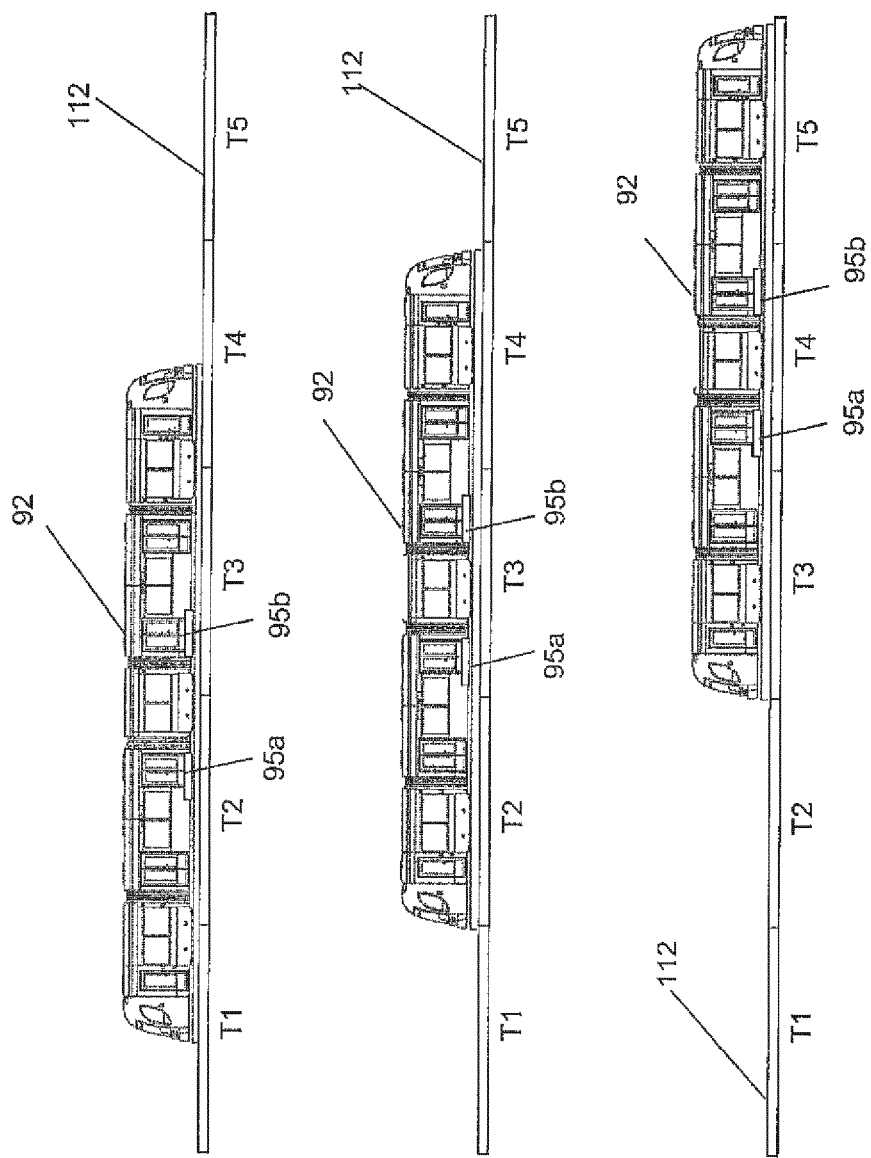

According to the examples shown in FIG. 3, a vehicle 92 (e.g. a tram) is moving from the left to the right. In the upper view, the vehicle 92 occupies the track above segments T1, T3 and partly occupies the track above segments T1 and T4. The receiving devices 95a, 95b are located always above segments which are fully occupied by the vehicle. This is the case, because the distance between the receiving devices to the nearest end of the vehicle in lengthwise direction is greater than the length of each segment of the conductor arrangement 112.

In the situation of the upper view, the segments T2, T3 are operated and all other segments T1, T4, T5 are not operated. In the middle view, where the vehicle 92 fully occupies the track above segments T2, T3 and nearly fully occupies the track above segment T4, operation of segment T2 has been stopped, because the receiving devices 95a has already left the region above segment T2, and segment T4 will start operation as soon as the vehicle fully occupies the region above the segment T4. This state, when the segment T4 is switched on is shown in the lower view of FIG. 3. However, in the meantime segment T3 has been switched off.

However, shorter vehicles may travel on the track and/or the lengths of the segments may be longer in the direction of travel. In these cases, an induced alternating electric current may be induced in a segment which is not fully occupied (i.e. not fully covered) by the vehicle.

Figure 4:
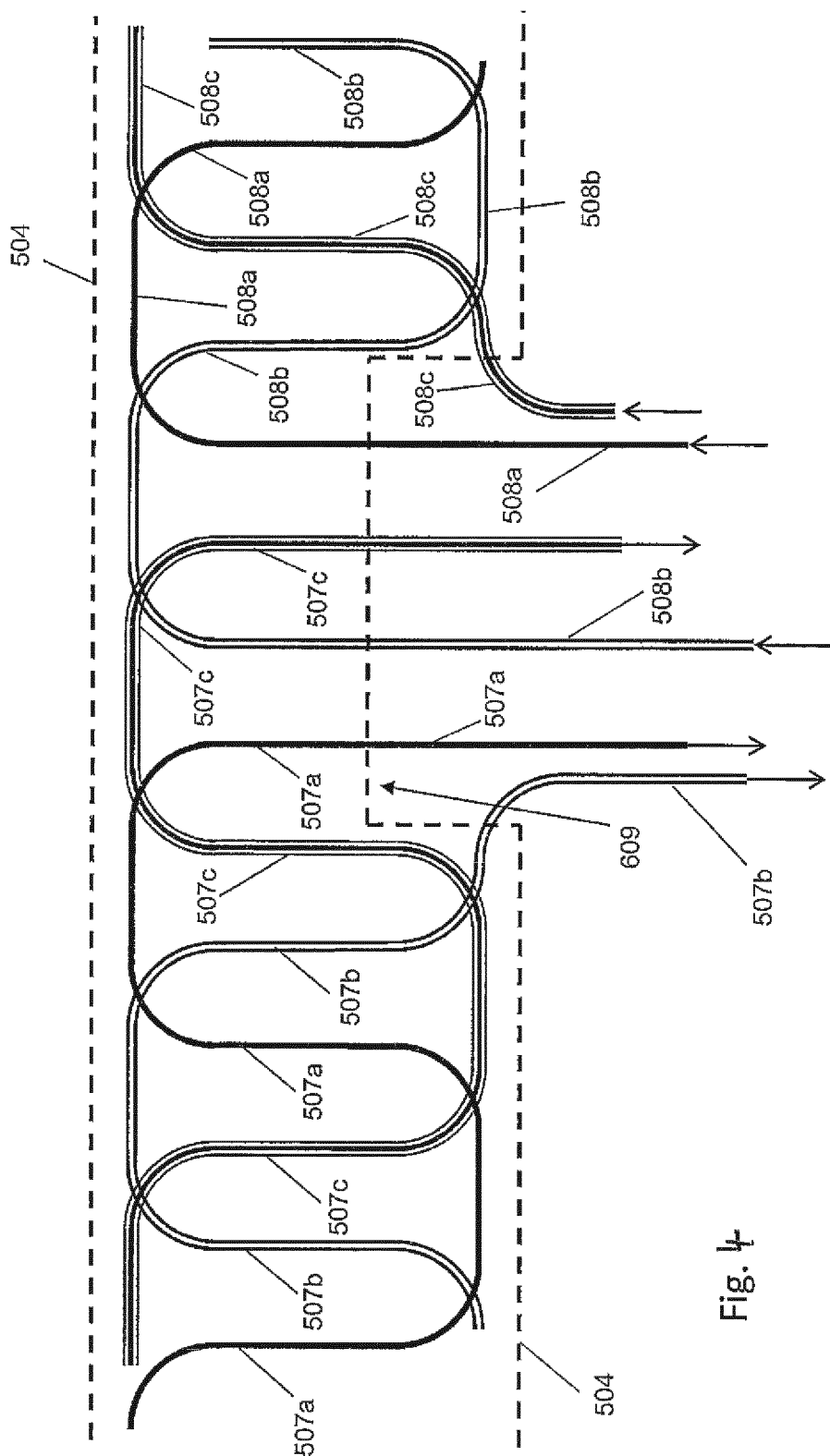

FIG. 4 shows an example of a transition zone of two neighbouring consecutive segments. The conductor arrangement 507a, 507b, 507c; 508a, 508b, 508c is a three-phase conductor arrangement, i.e. each of the two segments of the conductor arrangement shown in FIG. 4 comprises three phase lines for conducting three phases of a three phase alternating electric current. One of the three phases is indicated by a single line, the second of the three phases is indicated by a double line and the third of the three phases is indicated by a triple line. All electric lines are extending in a meandering manner in the direction of travel (from left to right or vice versa).

Each segment can be operated separately of each other, but the segments can also be operated simultaneously. FIG. 4 shows only one embodiment of overlapping regions of the neighbouring consecutive segments.

The segment shown on the left hand side in FIG. 4 comprises phase lines 507a, 507b, 507c. Following the extension of these phase lines 507, from left to right, each phase line 507 which reaches a cut-out 609 (indicated by a recess of the dashed outline of the track, which may be physical cut-out of a block carrying the lines) is conducted away from the track towards an inverter (not shown) for operating the phase lines 507. For example, phase line 507b reaches cut-out 609 where the cut-out 609 ends. In contrast to phase line 507b, phase lines 507a, 507c reach the cut-out 609 with a line section which extends from the opposite side of the line of shaped blocks towards the cut-out 609.

Each of the three phase lines 507 comprises line sections which extend transversely to the direction of travel. These transversely extending sections form a repeating sequence of phases in the direction of travel, i.e. a section of the first phase line 507a is followed by a section of the second phase line 507b which is followed by a line section of the third phase line 507c and so on. In order to continue with this repeated sequence of the phase lines in the transition zone, a phase line 508b (the second phase line) of the neighbouring segment is conducted through the cut-out 609 so that it forms a transversely extending line section in between the first phase line 507a and the third phase line 507c of the other segment where they reach the cut-out 609. In other words, the second phase line 508b of the second segment replaces the second phase line 507b of the first segment in order of the phases to continue with the repeated sequence of phase lines. The other phase lines of the second segment, namely the first phase line 508a and the third phase line 508c are conducted through cut-out 609 in a corresponding manner so that the sequence of phases, if the extension in the direction of travel is considered, is the same as for the first segment on the left hand side of FIG. 4.

FIG. 5 shows a second type of a transition zone of two neighbouring segments, for example also located in a cut-out 609 of the track. Same reference numerals in FIG. 4 and FIG. 5 refer to the same features and elements. FIG. 5 shows, for example, the segment shown on the right hand side in FIG. 4 and a further segment of the conductor arrangement. The phase lines of this further segment are denoted by 509a (first phase line), 509b (second phase line) and 509c (third phase line) of the further segment. The area of the cut-out 609 is used as an area for establishing electric connections between the three phases of each segment, i.e. a star point connection (see FIG. 2) is made for each segment. The star points are denoted by 511a or 511b. Preferably, the location of the star point 511 is at a greater distance to the upper surface of the cover layer than the line sections of the phase lines where the phase lines are located within the recesses or spaces which are defined by the shaped blocks. Therefore, the star point connections are well protected.

Figure 6:
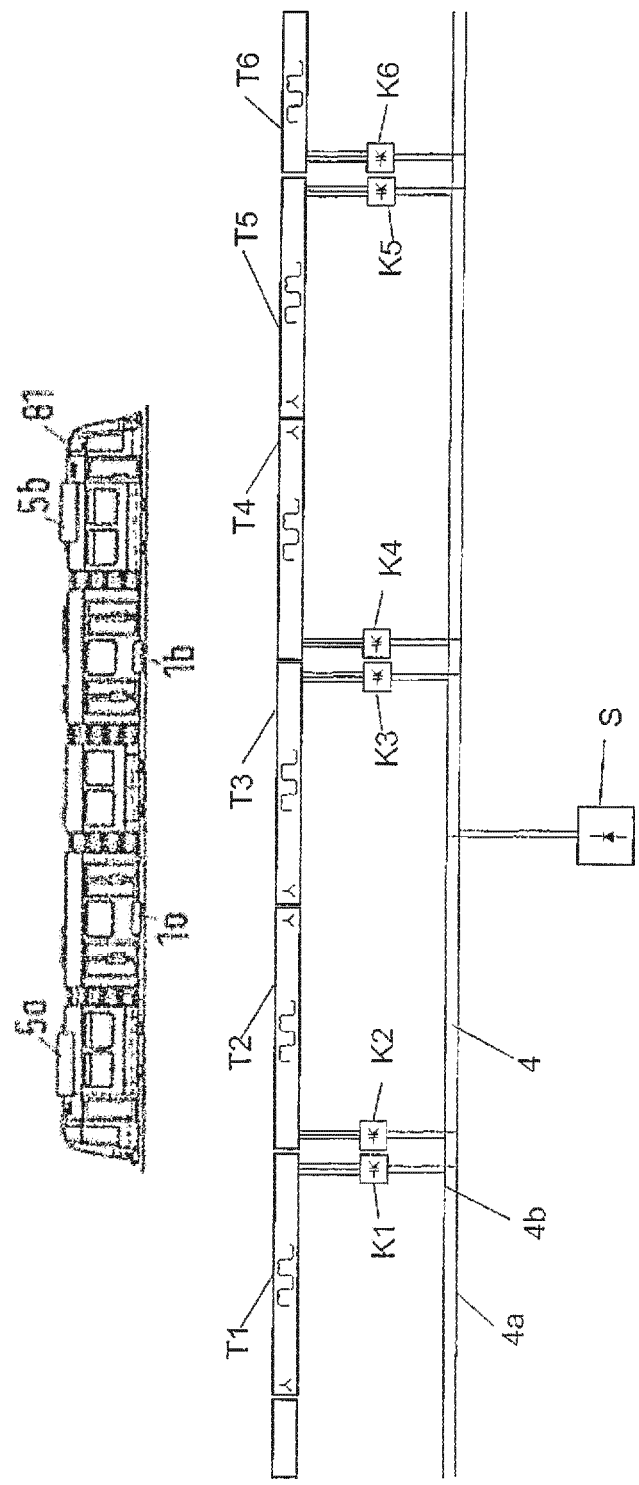

The arrangement of FIG. 6 comprises a direct current supply 4 having a first line 4a at a first electric potential and a second supply line 4b at another electric potential. A power source S is connected to the lines 4a, 4b. Each segment T comprises a plurality of lines (in particular three lines) for carrying a separate phase of an alternating current. The alternating current is generated by an assigned inverter K1, K2, K3, K4, K5, K6, which is connected to the direct current supply 4 at its direct current side. In the arrangement shown in FIG. 2 there is one inverter K per segment T. It should be noted that the inverters K are located in pairs nearby each other at the transition zones of neighbouring segments, for example according to the concept of FIGS. 4 and 5.

The current supply of FIG. 6 is a direct current supply connecting a central power source S with individual inverters. However, this principle can be modified. For example, in contrast to the arrangement shown in FIG. 6, at least one of the inverters may be connected to a plurality of alternating current supplies and each of these supplies connects the inverter with one segment, but not with neighbouring segments. Only one of the segments connected to the same inverter will be operated at a time.

Figure 7:
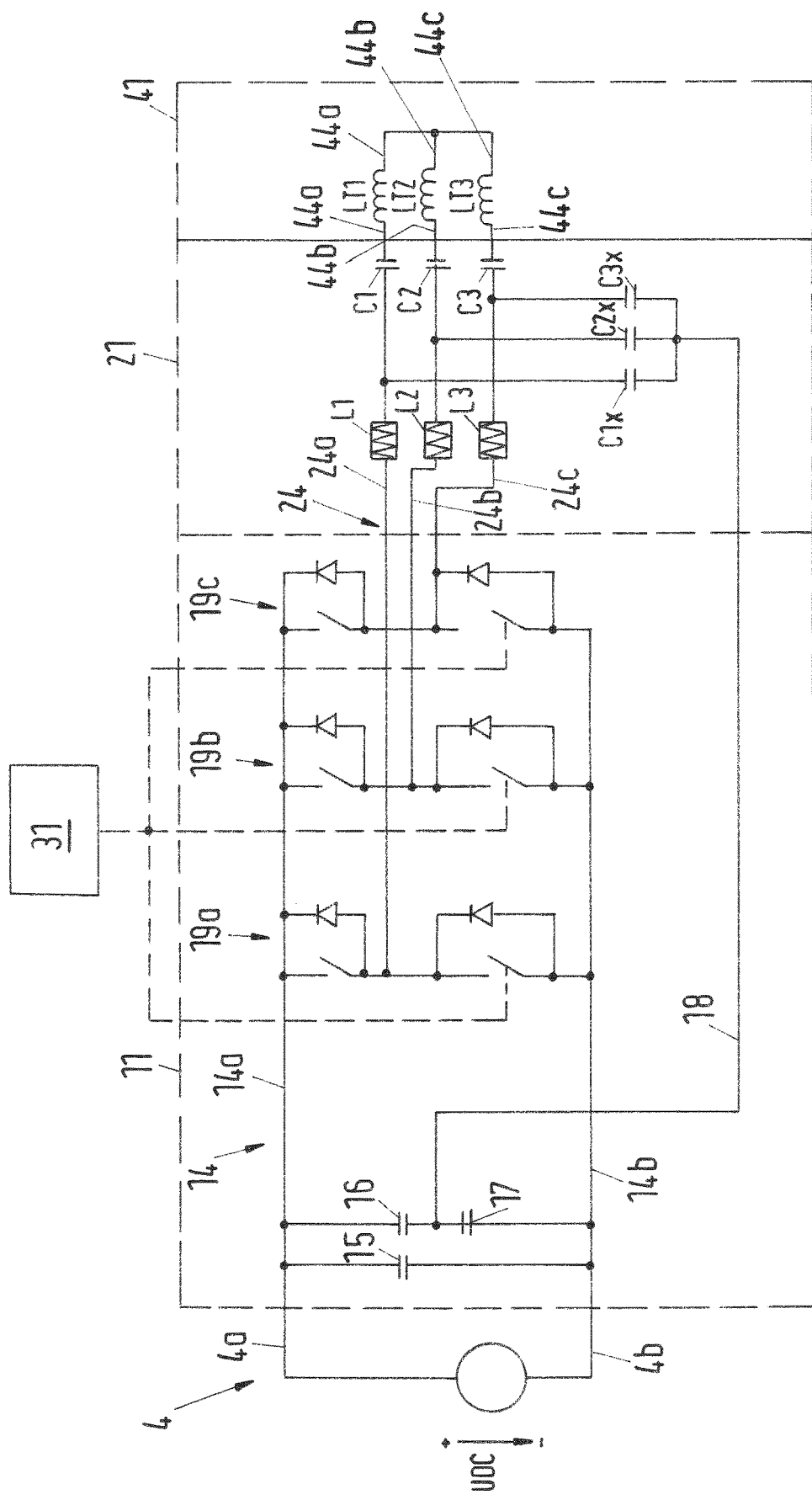

The circuit diagram of FIG. 7 shows a DC energy source on the left hand side. The voltage produced by the energy source is indicated by the reference sign UDC. For example, the energy source can be connected to different ones of the consecutive segments of an arrangement via a supply line 4. However, FIG. 7 only shows one of the segments.

A converter 11 is connected to the supply line 4. It comprises a DC intermediate circuit having two lines 14a, 14b which are connected to the lines 4a, 4b of the supply line 4. Capacitances 15, 16, 17 may connect the lines 14a, 14b of the intermediate circuit 14. In the example shown, two capacitances 16, 17 are connected in series to each other and there is a line 18 connected to a connection point in between the capacitances 16, 17. This line 18 connects a filter arrangement 21 to the connection point. The DC/AC converter 11 is a conventional semiconductor switch converter for generating an alternating current having three phases. Consequently, the converter 11 comprises three branches 19a, 19b, 19c with in each case one series connection of two semiconductor switches having three freewheeling diodes connected in parallel to each of the semiconductor switches. There is a connection point in between the semiconductor switches of each branch for connecting in each case one phase line for carrying the phases of the alternating current on the alternating current side of the converter 11. The switching actions of the semiconductor switches are controlled by a controller 31 of the converter 11. Corresponding control lines to each of the semiconductor switches are represented in FIG. 7 by dashed lines. Further components of the converter 11, such as gate drive units for driving the individual semiconductor switch (in particular an IGBT), are not shown in FIG. 7.

The alternating current line 24 having the phase lines 24a, 24b, 24c on the alternating current side of the converter 11 connects the connection points in between the semiconductor switches to a filter 21 which is a current source for producing a constant alternating electric current (i.e. an alternating current having a constant amplitude) through the segment 41 which is connected to the current source 21. In particular, each phase line 24a, 24b, 24c connects the converter 31 to a series connection of an inductance L1, L2, L3 and a compensating capacitance C1, C2, C3 to which the phase line 44a, 44b, 44c of the segment 41 is connected. The inductances formed by the phase lines 44a, 44b, 44c are represented by reference sign LT1, LT2, LT3 in FIG. 7.

In between the inductance L1, L2, L3 and the compensating capacitance C1, C2, C3 of the filter 21, there is in each phase a connection to a capacitance C1x, C2x, C3x of the filter 21. The opposite sides of the capacitances C1x, C2x, C3x are connected to each other and to the line 18 which connects to the connection point in between the capacitances 16 and 17 of the converter 11.

During operation of the segment 41 under control of the controller 31, the energy source provides a direct current to the converter 11 which generates a three phase alternating current through the phase lines 24a, 24b, 24c. The filter 21 produces the constant alternating current as mentioned before so that the alternating current through the phase lines 44a, 44b, 44c of the segment 41 is independent of the power which is actually transferred to any vehicle travelling on the track.

The segment of FIG. 7 is only one of a plurality of consecutive segments as shown, for example, in FIG. 1, FIG. 3 and FIG. 6. For example, each of the converters K1, K2, K3, K4 and K5 shown in FIG. 6 can be realized according to the circuit diagram shown in FIG. 7. Consequently, each of the segments T1, T2, T3, T4, T5 shown in FIG. 6 can be realized and can be connected to the converter according to the circuit diagram of FIG. 7.

Typically, the inductances LT1, LT2, LT3 are part of the current source, i.e. the inductances L1, L2, L3 and the capacitances C1x, C2x, C3x and the inductances LT1, LT2, LT3 of the segment 41 are adapted to each other so that the current source is formed. Furthermore, the resonance frequency of the part of the circuit formed by the segment 41 and the filter 21, including the compensating capacitors C1, C2, C3 is tuned to the resonance frequency of the receiver on board any vehicle travelling on the track and is equal to the resonance frequency of the other consecutive segments, in particular the neighbouring consecutive segment(s).

Figure 8:
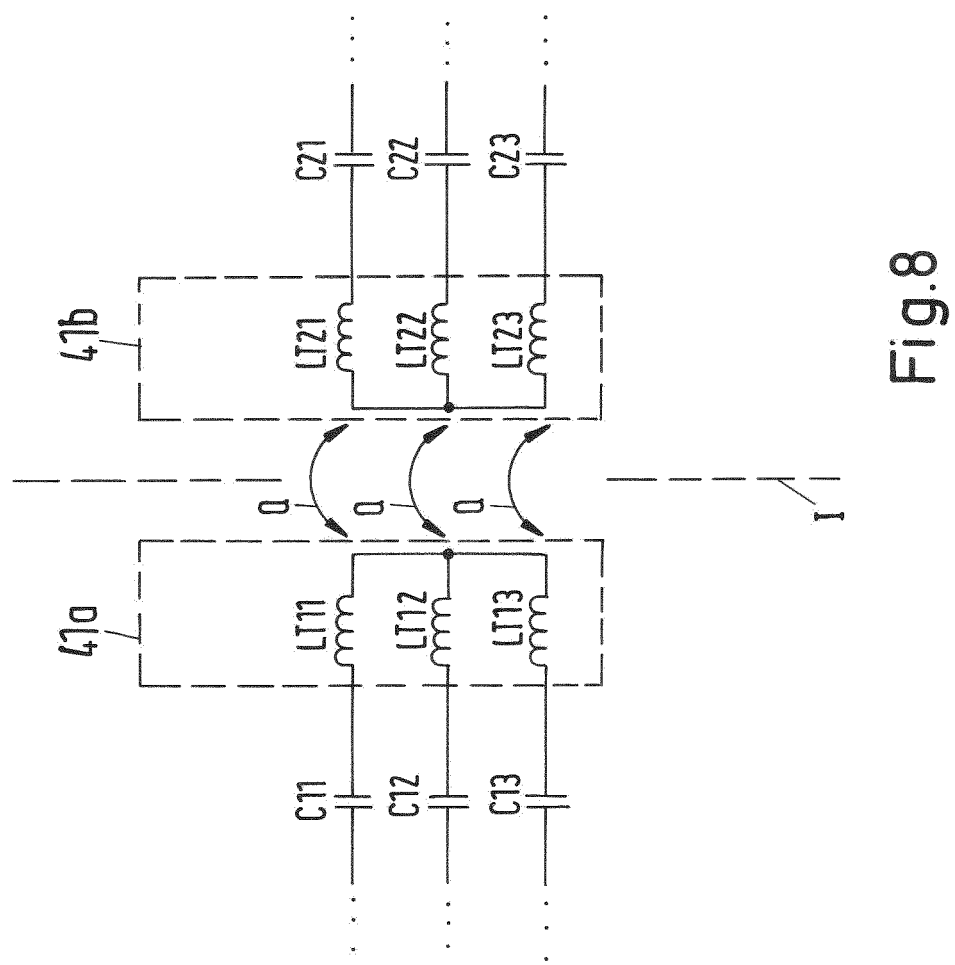

FIG. 8 schematically shows parts of circuit diagrams, which may be in each case the circuit diagram of FIG. 7, for two neighbouring consecutive segments 41a, 41b. In particular, the compensating capacitors C12, C13 of the first segment 41a on the left hand side of FIG. 8, the inherent inductances LT11, LT12, LT13 of the first segment 41a and the compensating capacitors C21, C22, C23 as well as the inherent inductances LT21, LT22, LT23 of the second, neighbouring segment 41b are shown. As well, FIG. 8 shows the inductive coupling between the segments 41a, 41b indicated by arrows and reference line Q. The interface between the neighbouring segments 41a, 41b is schematically indicated by a dashed line I. In the case of segments which are electrically connected in parallel to each other to a supply line, as for example shown in FIG. 6, the interface is not an electrical interface. However, as for example described in WO2010/031593A1, the interface may be an electrical interface. In any case, neighbouring segments, which have a small gap or no gap between each other or which overlap each other, can inductively be coupled so that an induced alternating electric current is produced in the other segment.

Figure 9:
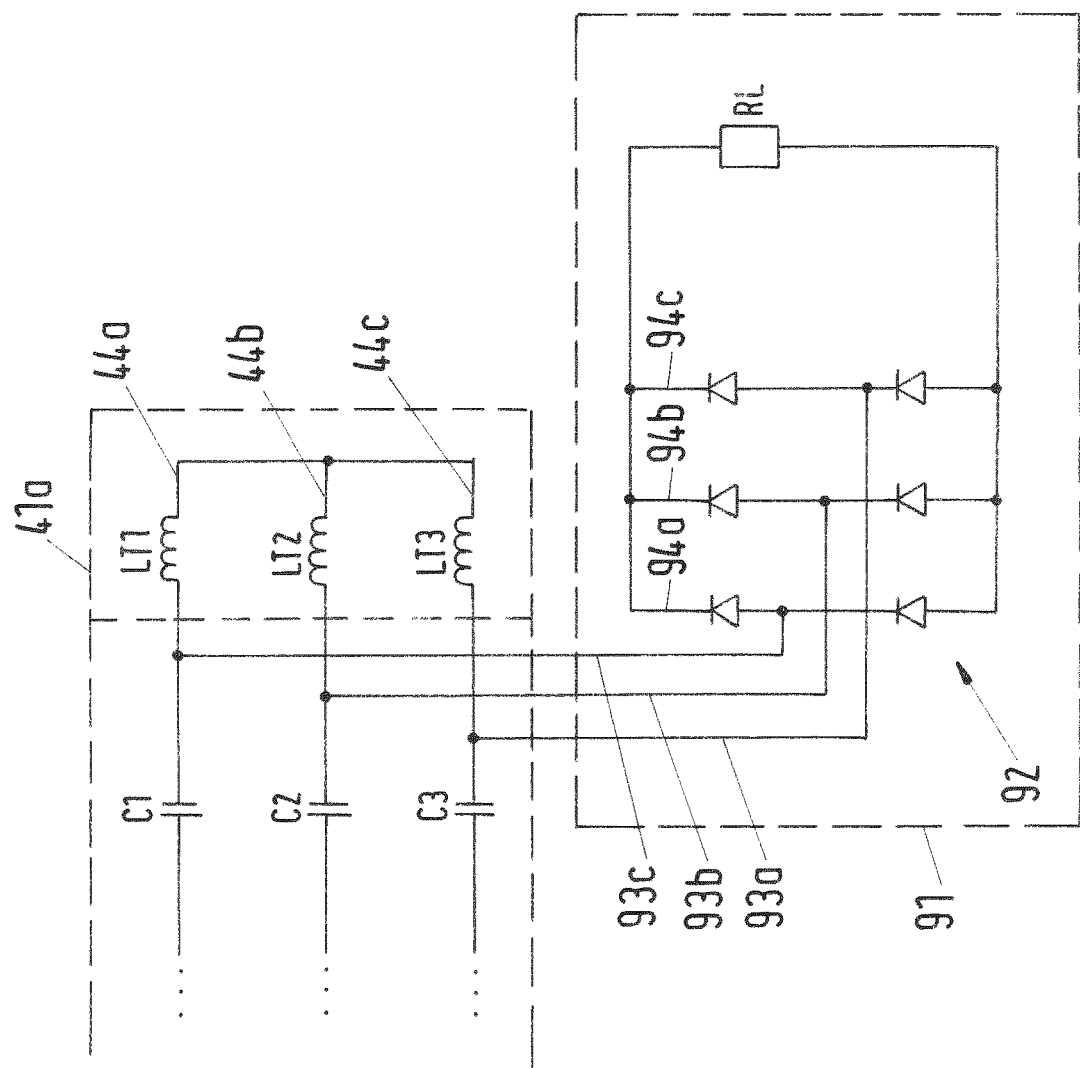

FIG. 9 shows an example of a circuit diagram with one of the segments of FIG. 8 and a rectifier which is connected to a resistive load RL. The value of the resistance is preferably smaller than 1 Ohm. This also applies to the case illustrated in FIG. 10, where the resistance is formed by a series connection of different elements. The rectifier 92 and the load RL form a unit 91 which has in each case one connection line 93a, 93b, 93c to the phase lines 44a, 44b, 44c of the segment 41a. In the example, the rectifier 92 has three branches 94a, 94b, 94c with in each case two diodes connected in series to each other, wherein the connection lines 93a, 93b, 93c are connected to a connection point in between the two diodes. The load RL is connected to the direct current side of the rectifier 92. As an alternative to a resistive load RL, another load, such as the DC/DC converter shown in FIG. 12 may be connected to the direct current side of the rectifier.

Any load can damp alternating electric currents in the phase lines 44a, 44b, 44c of the segment 41a. Therefore, the amplitude of the alternating electric current will not reach high values, even if the frequency of the alternating electric current matches or is nearby the resonance frequency of the segment 41a. In other words, the load withdraws energy from the segment and prevents the generation of electromagnetic fields by the alternating electric current at high power.

FIG. 9 is a schematic illustration of one way of connecting a load to the segment. The coupling of the load to the segment is shown as being permanent. However, this would also damp the alternating electric current through the segment while the segment is to be operated in order to transfer energy to a vehicle. One possibility to modify the circuit shown in FIG. 9 is to provide switches in the connection lines 93a, 93b, 93c. These switches can be controlled, for example, by the controller 31 of the assigned converter 11 and can be switched of (opened) if the segment is to be operated under control of the controller 31. In all other time periods, the switches can be in the closed state so that the load is coupled to the segment.

Figure 10:
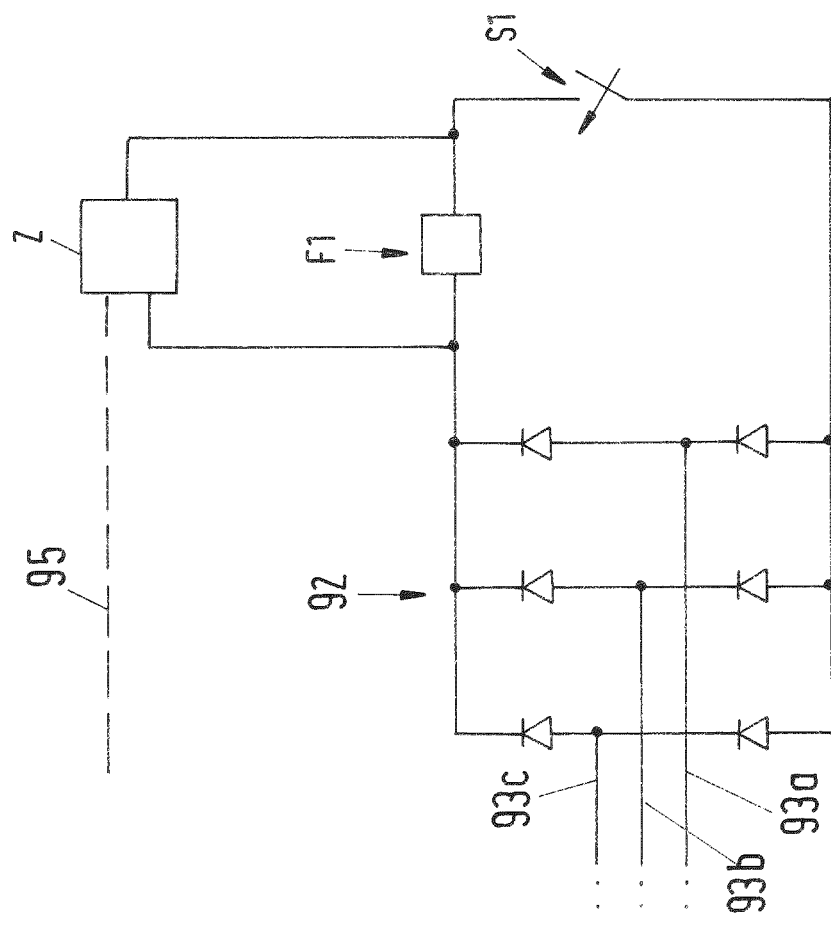

Another possibility of a controllable coupling is shown in FIG. 10. The rectifier 92, for example the rectifier shown in FIG. 9, is connected on its direct current side to a series connection of a fuse F1 and a controllable switch S1. Consequently, during operation of the rectifier 92 while an alternating current flows to the rectifier 92 via its connection lines 93a, 93b, 93c and while the controllable switch S1 is closed, a direct current flows through the fuse F1 and through the switch S1. This happens in particular if the segment, which the rectifier 92 is connected to, is not to be operated and a neighbouring segment is operated so that an alternating electric current is induced in the segment and flows to the rectifier 92. However, while the segment is to be operated, the switch S1 is open, for example by controlling the opening process (the process of switching off) under control of the controller 31 of the converter 11 or another control. More generally speaking, this means that the converter which is assigned to the segment may be operated in order to operate the segment while the switch S1 is open and the converter is not operated while the switch is closed.

In the example shown in FIG. 10, the load is formed by the series connection of the fuse F1 and the switch S1. Both elements form part of the resistive load. The switch S1 may be, for example, a MOSFET which is normally switched on while there is no control voltage applied to its control electrode.

The operating state of the fuse F1 is monitored by a monitoring unit Z which may comprise a voltage measurement devise for measuring the voltage across the fuse F1. In case of an over-current, the fuse F1 will open and, as a result, no load would be connected to the segment anymore, although the switch is in the closed state. The monitoring unit Z would detect the open state of the fuse F1 and, for example via a signal connection 95 to the controller of the neighbouring segment or to the controllers of the neighbouring segments, this controller or these controllers would receive the information about the open state of the fuse F1 and would stop and/or block the operation of the converter controlled by the controller. Therefore, no neighbouring segment can be operated while the fuse is in the open state. Consequently, the threshold values for electromagnetic field intensities are even met if the load cannot damp an induced alternating electric current.

FIG. 11 shows the filter 21 of FIG. 7 and different sets of connection point for connecting the load, in particular the rectifier 92 via the connection lines 93a, 93b, 93c. Each set of three connection points is indicated by a capital letter and an apostrophe. The connection points used in the example shown in FIG. 9 are denoted therefore by A'. Alternative connection points are in between the compensating capacitors C1, C2, C3 and the connection points to the capacitances C1x, C2x, C3x as denoted by B', at connection points C' in between the connection points between the inductances L1, L2, L3 and the connection points to the capacitances C1x, C2x, C3x as well as in between the connection points to the capacitances C1x, C2x, C3x and these capacitances as denoted by D'. The connection points A' have the advantage that the energy corresponding to the full induced alternating electric current in the segment is directly coupled to the load.

FIG. 12 shows a supply line 4 with separate DC lines 4a, 4b operated at different electric potentials. A plurality of segments 41a, 41b ... 41n is schematically shown in FIG. 12. Each segment 41 is connected to the supply line 4 via an assigned converter which is schematically shown by the reference sign WPC followed by the number of the segment. The converter at the top of FIG. 12 is therefore, for example, represented by the reference sign WPC1. The assigned converter of the neighbouring segment 41b is the second converter denoted by WPC2. At the bottom of FIG. 12, groups of three dots and the reference signs WPCn and 41n indicate that there are more consecutive segments 41 having in each case an assigned converter WPC.

Each converter WPC is part of a circuit CC which comprises the converter WPC, optional compensating capacitors C1, C2, C3 and a rectifier 92. An alternating current side of the rectifier 92 is connected to the segment 41, for example as shown in FIG. 11. Furthermore, the direct current side of the rectifier 92 is coupled to the supply line 4 via a DC/DC converter 105.

While the respective segment 41 is not to be operated, i.e. while the assigned converter is not operated, the DC/DC converter 105 is active and any induced alternating electric current in the segment 41 is rectified by the rectifier 92 and the corresponding energy is transferred by the DC/DC converter to the supply line 4. The DC/DC converter 10 may be a conventional step-up converter. The energy which is thereby re-coupled into the supply line 4 can be used for operating the neighbouring segment which causes the induced alternating electric current. For example, while the segment 41a is operated and the segment 41b is not operated, the energy which is coupled from the segment 41a into the segment 41b is at least partially transferred via the rectifier 92 and via the DC/DC converter of circuit CC2 back into the supply line 4 and can be used to operate the converter WPC1 and the segment 41a.

The DC/DC converter may be a converter with galvanic isolation of the DC side connected to the rectifier 92 and the DC side connected to the supply line 4. Therefore, there is no direct electric connection from the rectifier 92 to the supply line 4 through the DC/DC converter.

The invention claimed is:

1. An arrangement for transferring electric energy to a vehicle, wherein
   the arrangement comprises an electric conductor arrangement for producing an alternating electromagnetic field and for thereby transferring the energy to the vehicle,
   the conductor arrangement comprises a plurality of consecutive segments, wherein the segments extend in the direction of travel of the vehicle, which is defined by the track or a path of travel,
   each of the consecutive segments comprises at least one alternating current line for carrying a phase of an alternating current in order to produce the alternating electromagnetic field,
   each of the consecutive segments is combined with an assigned controller adapted to operate the segment independently of the other segments,
   at least two neighbouring segments of the consecutive segments are inductively coupled to each other so that a first segment of the neighbouring segments, while the first segment is operated under control of its assigned controller, induces a voltage and thereby produces an induced alternating electric current in a second segment of the neighbouring segments, if the second segment is not operated under control of its assigned controller,
   the arrangement comprises a controllable coupling for coupling the second segment to a load,
   the controllable coupling has a first operating state in which the second segment is coupled to the load so that any alternating electric current in the second segment is damped by the load, and has a second operating state in which the second segment is not coupled to the load so that any alternating electric current in the second segment is not damped by the load,
   the arrangement is adapted to switch the controllable coupling to the first operating state wherein the second segment is coupled to the load is before, while and/or after a time interval starts in which time interval the second segment is not operated under control of its assigned controller and in which time interval the first segment is operated under control of its assigned controller so that the alternating electric current induced in the second segment by operation of the first segment is damped by the load.

2. The arrangement of claim 1, wherein the first segment and the second segment partially overlap each other if viewed from a surface of the track or path of travel on which the vehicle may travel.

3. The arrangement of claim 1, wherein the controllable coupling comprises at least one controllable switch and the arrangement comprises a controller adapted to control the at least one controllable switch.

4. The arrangement of claim 1, wherein the load comprises a resistance which damps the induced alternating electric current in the second segment, which is produced by operation of the first segment.

5. The arrangement of claim 1, wherein the load comprises a fuse through which the induced alternating electric current in the second segment flows, wherein the fuse is combined with a monitoring unit for monitoring an operating state of the fuse and for indicating an open state of the fuse, in which an electric current through the fuse is blocked, and wherein the arrangement comprises a control connected to the monitoring unit, the control being adapted to prevent operation of the first segment if the fuse of the load, which is coupled to the second segment, is in the open state.

6. The arrangement of claim 1, wherein the load comprises a current converter, which couples the second segment to a supply line for supplying energy to the first segment during operation of the first segment.

7. The arrangement of claim 1, wherein the load is coupled to the second segment in the first operating state of the controllable coupling via a rectifier adapted to rectify the induced alternating electric current in the second segment to a direct current flowing through the load.

8. The arrangement of claim 1, wherein the vehicle is a track bound vehicle.

9. The arrangement of claim 1, wherein the vehicle is a rail vehicle.

10. The arrangement of claim 1, wherein the vehicle is a road automobile.

11. A method of operating an arrangement for transferring electric energy to a vehicle, wherein
    an electric conductor arrangement is operated for producing an alternating electromagnetic field and for thereby transferring the energy to the vehicle,
    a plurality of consecutive segments of the conductor arrangement is operated, wherein the segments extend in the direction of travel of the vehicle, which is defined by the track or path of travel,
    for each of the consecutive segments, an assigned controller is operated to operate the segment independently of the other segments,
    an alternating current flows through an alternating current line or through alternating current lines of any of the consecutive segments while the segment is operated under control of its assigned controller,
    due to an inductive coupling of at least two neighbouring segments of the consecutive segments and while a first segment of the neighbouring segments is operated under control of its assigned controller, a voltage is induced in a second segment of the neighbouring segments and thereby an induced alternating electric current is produced in the second segment,
    a controllable coupling for coupling the second segment to a load is controlled to be either in a first operating state in which the second segment is coupled to the load so that any alternating electric current in the second segment is damped by the load, or in a second operating state in which the second segment is not coupled to the load so that any alternating electric current in the second segment is not damped by the load,
    the controllable coupling is switched to the first operating state wherein the second segment is coupled to the load before, while and/or after a time interval starts in which time interval the second segment is not operated under control of its assigned controller and in which time interval the first segment is operated under control of its assigned controller so that the alternating electric current induced in the second segment by operation of the first segment is damped by the load.

12. The method of claim 11, wherein the first segment and the second segment partially overlap each other if viewed from a surface of the track on which the vehicle may travel.

13. The method of claim 11, wherein a controller controls at least one controllable switch of the controllable coupling in order to switch the controllable coupling from the first operating state to the second operating state and vice versa.

14. The method of claim 11, wherein a resistance of the load damps the induced alternating electric current in the second segment, which is produced by operation of the first segment, in the first operating state of the controllable coupling.

15. The method of claim 11, wherein the induced alternating electric current in the second segment flows through a fuse of the load, wherein an operating state of the fuse is monitored and an open state of the fuse, in which an electric current through the fuse is blocked, is indicated to a control that prevents operation of the first segment if the fuse of the load, which is coupled to the second segment, is in the open state.

16. The method of claim 11, wherein a current converter of the load couples the second segment, while the induced alternating electric current flows in the second segment, to a supply line for supplying energy to the first segment during operation of the first segment.

17. The method of claim 11, wherein the load is coupled to the second segment in the first operating state of the controllable coupling via a rectifier which rectifies the induced alternating electric current in the second segment to a direct current flowing through the load.

18. The method of claim 11, wherein the vehicle is a track bound vehicle.

19. The method of claim 11, wherein the vehicle is a rail vehicle.

20. The method of claim 11, wherein the vehicle is a road automobile.

\* \* \* \* \*